(12) United States Patent
Schmall et al.

(10) Patent No.: US 7,069,589 B2
(45) Date of Patent: Jun. 27, 2006

(54) DETECTION OF A CLASS OF VIRAL CODE

(75) Inventors: Markus Schmall, Bonn (DE); Tony Kwan, Doncaster (AU)

(73) Assignee: Computer Associates Think, Inc.., Islandia, NY (US)

( * ) Notice: Subject to any disclaimer, the term of this patent is extended or adjusted under 35 U.S.C. 154(b) by 710 days.

(21) Appl. No.: 09/905,342

(22) Filed: Jul. 14, 2001

(65) Prior Publication Data
US 2002/0066024 A1 May 30, 2002

Related U.S. Application Data

(60) Provisional application No. 60/218,488, filed on Jul. 14, 2000.

(51) Int. Cl.
*G06F 12/18* (2006.01)
*H04K 1/00* (2006.01)

(52) U.S. Cl. .......................... 726/24; 713/188
(58) Field of Classification Search ............... 713/200, 713/201, 187, 188, 193, 194; 726/24
See application file for complete search history.

(56) References Cited

U.S. PATENT DOCUMENTS 5,826,013 A * 10/1998 Nachenberg ............... 713/200

OTHER PUBLICATIONS

Dr. Frans Veldman, "Heuristic Anti-Virus Technology", 1994-1995, pp. 1-12.*

* cited by examiner

*Primary Examiner*—Matthew Smithers
*Assistant Examiner*—Courtney Fields
(74) *Attorney, Agent, or Firm*—Baker Botts L.L.P.

(57) ABSTRACT

A method and apparatus for detecting a class of viral code are provided. The apparatus comprises an heuristic analyzer and a search component. The heuristic analyzer heuristically analyzes a subject file and generates a set of flags along with statistical information. The search component uses the set of flags with statistical information to perform a search for a scan string and/or a statement type in the subject file. A positive detection alarm is triggered if the scan string and/or statement type is found at least a corresponding predetermined number of times. The heuristic analyzer may be rule-based and comprise an heuristic engine and heuristic rules. The search component also may be rule-based and comprise a search engine and viral code class rules.

20 Claims, 6 Drawing Sheets

DETECTION OF A CLASS OF VIRAL CODE

CROSS-REFERENCE TO RELATED APPLICATIONS

This application claims the benefit of provisional application Ser. No. 60/218,488, filed Jul. 14, 2000 and entitled "DETECTION OF A CLASS OF MALICIOUS CODE."

TECHNICAL FIELD

The present disclosure relates to the detection of computer viruses. More specifically, the disclosure relates to the detection of a class of viral code.

DESCRIPTION OF THE RELATED ART

Computer viruses are a major problem in modem day computing. Generally, a computer virus is a computer program or some unit of computer executable code, e.g., instructions to which a computer responds, such as a code block, code element or code segment. When the viral code is executed on a computing device, it typically attaches to other programs or sets of computer instructions and/or replicates itself. In this way, the virus exists within and "infects" otherwise normal programs. Another typical objective of a computer virus is to perform unsolicited actions on the target computer, without the knowledge and authorization of the computer user, and thereby perform unwanted, and also possibly harmful, actions on components of the computer and/or information stored on the computer.

Some viral code may cause damage to an infected computer and/or information stored on the computer, or prevents the computer from being used in its normal manner. For example, some viruses alter or destroy data or program files stored on, for example, the hard drive of the infected computer, which typically results in considerable downtime for the computer. Additionally, in some instances the integrity of an organization's computer database(s) is attacked, and the organization, without notice of the data corruption, continues operation using inaccurate data. Even if corrupted data is detected, the organization often has to, upon discovery of the problem, take time to recover its database before it may continue its normal operation.

Frequently, the viral code resides in a file containing computer executable code comprising a collection of computer instructions. Each time the infected code runs on a computing device/system, the viral code has the opportunity to spread and damage the device/system. For example, the virus may spread by adding itself to computer executable code in some other program on a computer, then changing the preexisting code in such a way that the newly added viral code may be executed to further replicate itself in yet another program. Infected programs can exist anywhere in the computer system, including the operating system, and if not detected can cause potentially devastating problems.

The virus also may spread from one computer file to another, and from one computer to another by attaching itself to a file or program in a removable storage medium, such as floppy disk, compact disc (CD), digital versatile disc (DVD), etc., that is accessible when the computer runs or accesses the infected file or program. If a user then places that infected medium into a second computer and the second computer runs or accesses the infected file or program, the virus will attempt to infect the second computer, and so forth. In addition, the virus may spread from one computing machine to another by attaching to data transmissions between the computer machines via a network or other transmission medium.

Assorted techniques have been proposed to detect and/or foil viruses. Anti-virus programs may search for characteristic behaviors of viruses and remove any found virus. For example, virus scanner programs scans a file or set of files, such as executable files, application macro files, disk boot sectors, etc., for particular known viruses. Typically, the virus scanner program searches for known virus signatures or byte strings. A virus signature is a pattern of (not necessarily sequential) characters or instructions that is found in each instantiation of the associated virus.

Searching for virus strings inside infected files, however, is rarely successful against newer viruses because programmers who create computer viruses now usually employ obfuscation techniques to protect their viral code from anti-virus scanners. One common obfuscation technique is virus code encryption. The virus code in its encrypted form may be attached to or inserted in a file or program. Frequently, the target of the encrypted viral code is a program file containing computer executable code comprising a collection of computer instructions. Each time the infected code runs, the encrypted virus code is decrypted in memory using a decryptor before control is transferred to the decrypted virus code. The encryption technique may vary from one generation of the virus to another generation so that the byte stream of each new viral infection is different from its predecessor.

Another anti-virus technique includes use of a cyclical redundancy check (CRC). For each and every file to be protected, a unique CRC signature in the form of a 2-byte number derived from the contents of the subject file is generated and then stored in either the subject file itself or a separate file. At a later time, a CRC error checking program determines whether such files have been tampered with or otherwise become corrupted since the CRC signature was generated and stored, by generating a second CRC signature and then comparing the stored CRC signature with the second CRC signature. If the two signatures do not match then the information/data in the subject file is deemed to be corrupted. CRC programs have the disadvantage that they are easy to identify and thus easily tricked into generating a CRC signature for the infected file that is identical to the stored CRC signature.

A virus is "polymorphic" if it copies itself differently to change its signature and make itself appear different each time it spreads. For example, garbage code may be inserted along with the virus in the file to which it is copied, or the order of code execution of the virus is changed. Typically, the functionality of the virus remains the same but the actual code is different. Thus, polymorphic viruses can escape detection by signature scanning or CRC methods.

SUMMARY

The present disclosure provides a method of detecting a class of viral code. In one embodiment, the method includes heuristically analyzing a subject file to generate a set of flags along with statistical information, using the set of flags with statistical information to perform at least one search for a scan string and/or a statement type in the subject file, and triggering a positive detection alarm if each of the at least one search is found at least a corresponding predetermined number of times. The subject file may include source code in a predetermined programming language. The predetermined programming language may be a script language. Alternatively, the subject file includes a file for a predetermined word processor.

At least one flag in the set of flags may correspond to a copy operation associated with one of the class of viral code, an operation for adding data from a string to a target module, an operation for importing another code, or an operation for disabling virus protection features in a target application.

The searched statement type may correspond to an operation for disabling functionalities in a target application or an operation for overwriting system macros.

The present disclosure also provides an apparatus for detecting a class of viral code. In one embodiment, the apparatus includes an heuristic analyzer and a search engine component. The heuristic analyzer analyzes a subject file to generate a set of flags along with statistical information. The search engine component uses the set of flags with statistical information generated by the heuristic analyzer to perform at least one search for a scan string and/or a statement type in the subject file, and triggers a positive detection alarm if each of the at least one search is found at least a corresponding predetermined number of times.

The heuristic analyzer, in accordance with one embodiment, is rule-based and comprises an heuristic engine and heuristic rules. The heuristics engine, using the heuristic rules, parses the subject file. The heuristics rules may include sets of heuristic flags stored in a rules table.

The search component, in accordance with one embodiment, is rule-based and comprises a search engine and viral code class rules. In another embodiment, the search component is a neural network.

BRIEF DESCRIPTION OF THE DRAWINGS

The features of the present disclosure would be more readily understood from the following detailed description by referring to the accompanying drawings wherein.

DETAILED DESCRIPTION

The present disclosure provides methodologies (in the form of apparatus, systems and methods) for detecting a class of viral code which, according to one embodiment, are based on a combination of the following techniques: heuristic analysis of a subject computer code; use of statistic information; and use of search string/operation functionality. Combining these techniques enables classification of viral code that cannot be classified using any single technique. It should be noted that the apparatus, systems and methods according to the present disclosure analyzes files containing executable computer code, so that each file being analyzed is also referred to herein as a "subject file".

Figure 6:
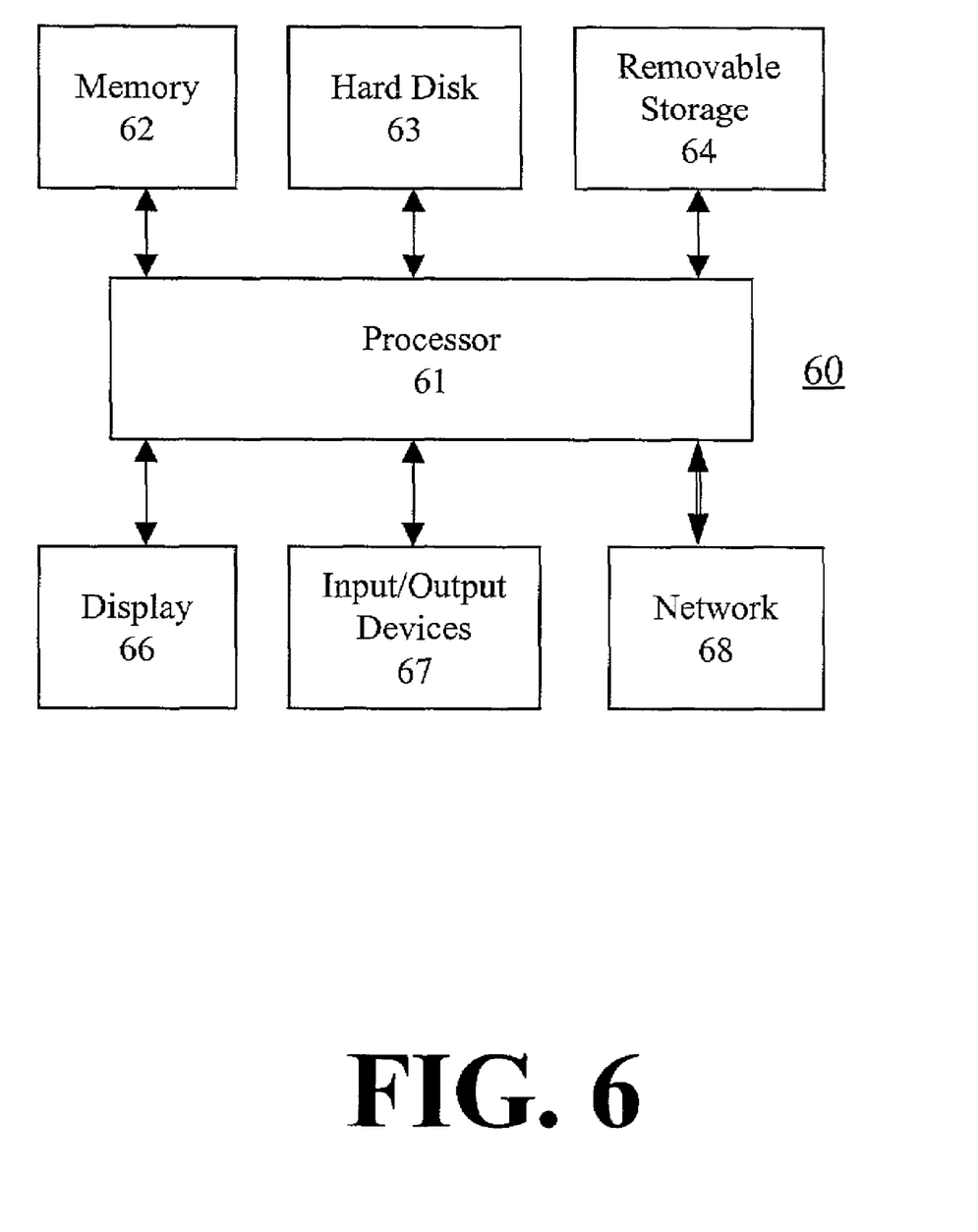
FIG. 6 shows a block diagram of a typical computing system/device that may be a target of a computer virus.

FIG. 6 illustrates a computer system or computer 60 on which the subject file may be executed. Computer system 60 includes a processor 61, memory 62, hard disk 63, removable storage drive 64 (for reading/accessing removable storage media, such as floppy disks, CDs, DVDs, etc.), display 66, I/O devices 67 (for example, keyboard, mouse, microphone, speaker, etc.), and a wired or wireless connection to a network 68. The network can be, for example, a LAN, a WAN, an intranet, an extranet, the Internet, and/or any combinations of such networks. Computer 60 may be any of the computing devices/systems known in the art, such as, for example, a personal computer, a laptop, a workstation computer, a mainframe computer, a personal digital assistant (PDA), etc. (also referred to herein either separately or collectively as "computing device", "computer", "computer system" or "computing system"). A file or program containing executable computer code may reside on/in, for example, hard disk 63 and/or a removable storage medium that may be read/accessed through removable storage drive 64. Also, the executable computer code may be downloaded to the computer system or computer through network 68.

Figure 2:
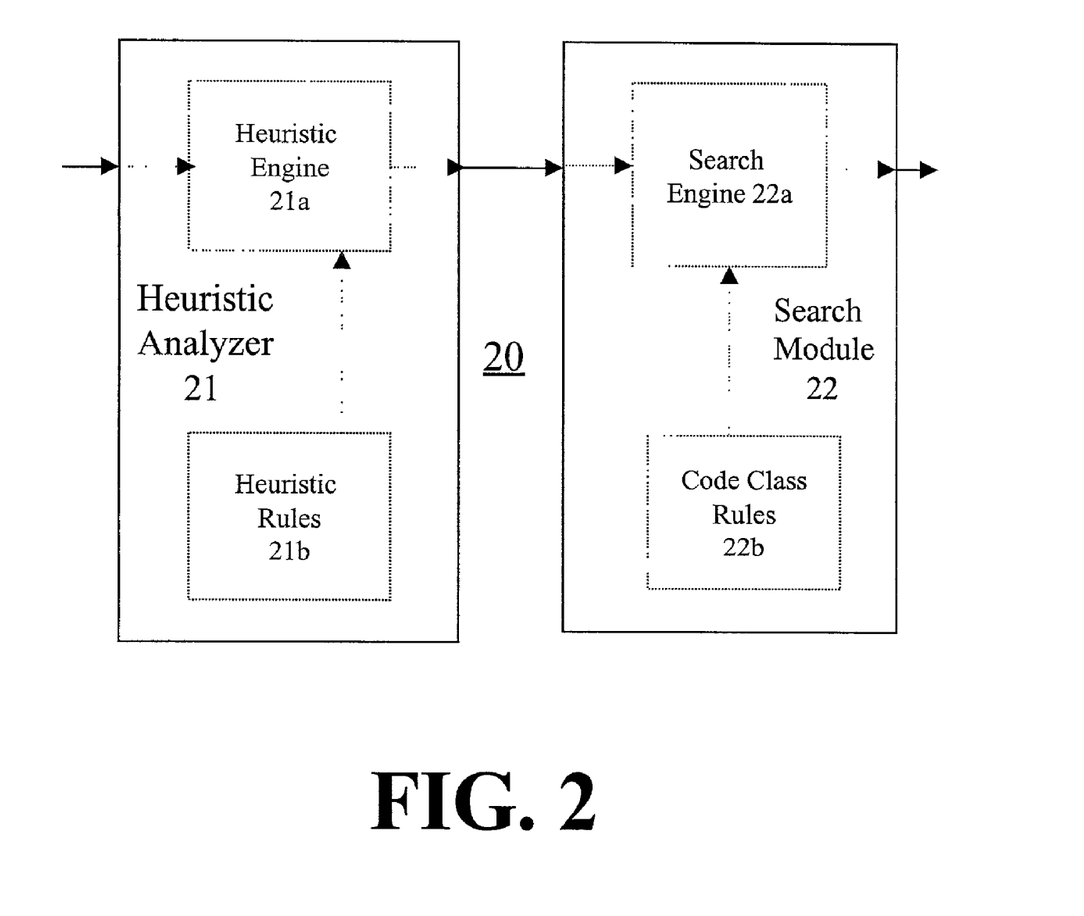
FIG. 2 shows a block diagram of an apparatus, according to an embodiment of the present disclosure, for detecting a class of viral code.

An apparatus 20 according to one embodiment of the present disclosure for detecting a class of viral code is shown in FIG. 2. Apparatus 20 includes a heuristic analyzer 21 and a search module 22. The heuristic analyzer 21, in accordance with one embodiment, may be rule-based and include engine 21a and rule table 21b. The search module 22 may include search engine 22a and code class rule base 22b.

Figure 1:
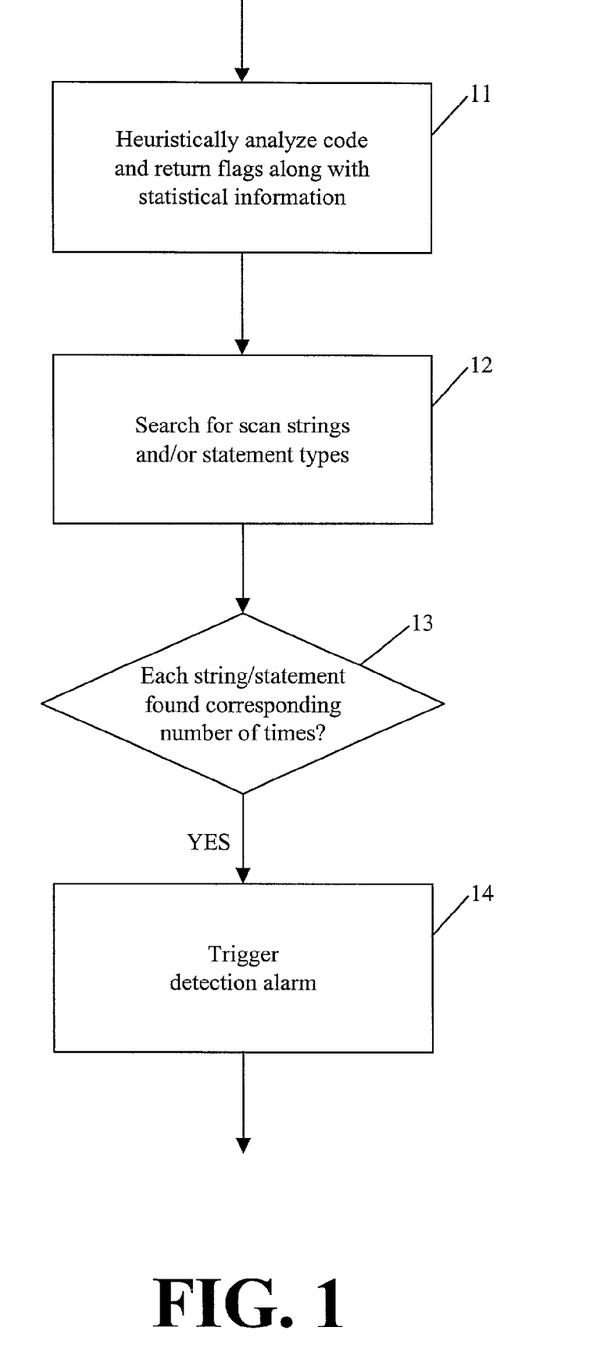
FIG. 1 shows a flow chart of a process, according to an embodiment of the present disclosure, for detecting a class of viral code.

A method of detecting a class of viral code, according to an embodiment of the present disclosure, will be described with reference to FIGS. 1 and 2. Executable computer code in the subject file is heuristically analyzed by analyzer 21 to generate a set of flags with statistical information (step 11). The set of flags with statistical information is used by search module 22 while searching for at least one scan string and/or statement type in the subject source code (step 12). If it is determined by search module 22 that each of the at least one scan string and/or statement type is found at least a corresponding predetermined number of times (step 13), a positive detection alarm is triggered (step 14). The detection method may be embodied in a computer program (or some unit of code) stored on a computer readable medium, such as a CD, and/or transmitted via a computer network, such as the Internet, or another transmission medium.

A more detailed description of the subject matter of this disclosure is provided below. The present disclosure provides a method of detecting viruses belonging to known families or based on known ideas in a reliable and secure way. The method may be used to detect virus types, such as W97M/Chydow.A, using scan strings, if the chosen scan strings are very short and not unique. A combination of techniques including using statistical information from the output of an heuristic engine and a scan string search engine increases the quality of detection.

In a first phase, the heuristic analyzer analyzes a subject file and generates a set of flags. The executable computer code in the subject file may be any kind of source code written in a known programming language, such as Visual Basic Script 5/6 and Visual Basic for Applications (VBA) 5/6, which one of ordinary skill in the art can readily read. For some viruses (e.g., the W97M/Class family) the flags generated by the heuristic analyzer are sufficient to provide reliable family detection.

An example of flags generated by the heuristic analyzer is shown below for the W97M/Class.ES virus:

VBA_BUILT_IN_Module_Count 1
VBA_BUILT_IN_Statement_Count 36

VBA_ConfirmConversions 1
VBA_SaveNormal 1
VBA_ReplaceLines_CodeModule1
VBA_ReplaceLines_Template 1
VBA_AddFromString_CodeModule 2
VBA_CountOfLines_CodeModule3
VBA_CountOfLines_Document 1
VBA_CountOfLines_Template 2
VBA_CountOfLines_In_For 1
VBA_DisableVirusProtection 1
VBA_DisableCancel 1
VBA_Lines_CodeModule 4
VBA_Lines_Document2
VBA_Lines_Template 2
VBA_Lines_In_If2
VBA_CodeModule 1
VBA_Import_Code_String 4

Nineteen flags, with the first two being statistic flags, are shown above. The statistic flag "VBA_BUILT_IN_Module_Count 1" shown above indicates that the heuristic analyzer examined exactly one module and the other flags in the set are generated based on this module. The statistic flag "VBA_BUILT_IN_Statement_Count 36" shown above indicates that the heuristic parser examined 36 "heuristic" instructions. The number of heuristic instructions usually differs from the number of actual instructions within a module.

For each of the remaining flags, a corresponding number which appears behind the identified flag is the total number of occurrences of the flag in the analyzed code. Each of these flags will now be explained. The flag VBA_ConfirmConversions indicates that the analyzed program includes code that disables the "confirm conversion requester", which possibly may be a dangerous operation. The flag VBA_SaveNormal indicates that the file will be saved as a template (e.g., the global existing "normal.dot" file from Microsoft Word). The flag VBA_ReplaceLines_CodeModule indicates that the program contains code to replace several lines of code. The flag VBA_ReplaceLines_Template indicates that the program contains code to replace several lines of code in the template. The flag VBA_AddFromString_CodeModule indicates that the program contains code to add data from a string to a code module. The flag VBA_CountOfLines_CodeModule indicates that the number of lines within a code module is calculated. The flag VBA_CountOfLines_Document 1 indicates that the number of lines within a document is calculated. The flag VBA_CountOfLines_Template indicates that the number of lines within a template is calculated. The flag VBA_CountOfLines_In_For indicates that the number of lines (not defined the base for the line counter calculation) is used in a "for" loop. The flag VBA_DisableVirusProtection indicates that the built-in virus protection from Microsoft Word 97 is deactivated. The flag VBA_DisableCancel indicates that the "cancel" key (per default ESC key) is deactivated, so that the user cannot stop a macro from running. The flag VBA_Lines_CodeModule indicates that a line read operation is performed in a code module. The flag VBA_Lines_Document indicates that a line read operation is performed in a document. The flag VBA_Lines_Template indicates that a line read operation is performed in a template. The flag VBA_Lines_In_If indicates that the result from a line operation (no source defined) is used in a "if" condition (usually some kind of self test or infection test). The flag VBA_Import_Code_String indicates that the code imports some other code, which can be, e.g., the result of a "lines" operation or similar function, which stores data in a variable.

Copy operation may be identified by, for example, the subset of flags VBA_AddFromString_CodeModule, VBA_Lines_CodeModule, VBA_Lines_Document, VBA_Lines_Template and VBA_Import_Code_String. By using the operations corresponding to the flags having a prefix "VBA_Lines_", it is possible to save information from code modules into a string, which can be later reinserted by the use of VBA_AddFromString_CodeModule. If the string to be inserted contains VBA code, the heuristics likely show the VBA_Import_Code_String flag. Therefore, the subset of flags specified exemplarily above suggests a full copy cycle of a specific macrovirus.

Even parts of the self-check routines are identified, for example, by the flag VBA_Lines_In_If. Typical Microsoft Office 97 Service Release 1 (and above) compatible viruses try to read one special line from the module to be targeted and check the contents. The virus does not activate the replication code, if a content that indicates the virus already has infected the file is found. VBA_Lines_In_If, i.e. the result of a "VBA_Lines_" type of operation is utilized within an "If" construction, suggests this type of viral check. This behavior does not indicate that the functionality necessarily is viral. However, the functionality is suspicious since it is found within a high number of current viruses.

Means for detection and classification as a "Class" family may be provided as follows. The above-mentioned flags may be inserted in a rules table. When the heuristic engine is searching a source code using the rules table and detects these flags (plus perhaps some additional flags), the heuristic engine will generate a flag indicating that a virus was found (in this case W97M/Class family). Highly polymorphic viral code, as found for example in the W97M/Chydow family, may escape detection since there may not be many useable heuristic flags found.

A typical set of flags generated by the heuristic analyzer for the W97M/Chydow.A virus is as follows:
BVA_BUILT_IN_Module_Count 1
BVA_BUILT_IN_Statement_Count 1054
VBA_ConfirmConversions 1
VBA_InsertLines_CodeModule 1
VBA_InsertLines_Document 1
VBA_DisableVirusProtection 1
VBA_CodeModule 1
VBA_Rnd 8
VBA_Documents_Add 1

Nine flags, with the first two being statistic flags, are shown above. This set of flags is insufficient, however, for identifying a specific family of viral code. The flag VBA_InsertLines_CodeModule indicates that code is inserted line-by-line in a code module. The flag VBA_InsertLines_Document indicates that code is inserted line-by-line in a document. The flag VBA_CodeModule indicates that the Visual Basic Object "codemodule" is used. The flag VBA_Rnd indicates that the Visual Basic randomize function is called. The flag VBA_Documents_Add indicates that a new document is added to the current Microsoft Word session.

The detection may be strengthened by setting lower bounds on the number of times that a particular program feature has been found. Using this improvement, a set of heuristic flags for the Chydow macrovirus, with lower bounds, appears as follows:
unsigned short chydowFlags[ ]=
{

VBA_InsertLines_CodeModule,
VBA_InsertLines_Document,
VBA_DisableVirusProtection,
VBA_CodeModule,
OP_FLAG_AT_LEAST, VBA_Rnd, 8
VBA_Documents_Add,
};

The heuristic flag entry "OP_FLAG_AT_LEAST, VBA_Rnd, 8" shows that the "Randomize" function must be used at least 8 times within the examined macro, before the heuristic rule is triggered. Using lower bounds improves the detection, but under some circumstances may match non-viral code that uses similar language features.

To further strengthen the detection, scan string and command search operations are performed to positively classify the viral code. A further improved rule for classification of the Chydow virus is as follows:

{SIM_RULE(chydowFlags), "Chydow", INFECTION_VIRUS, 3, {
    {SEARCH_SOURCE_CODE, ":\r", 50},
    {SEARCH_STATEMENT_TYPE, "if", 5},
    {SEARCH_STATEMENT_TYPE, "()", 5}}}.

"SIM_RULE," which is an internal macro, expects as a direct parameter an heuristic flag set, which may be found as described above, before the next operation is performed. The identification of the direct parameter is followed by the name of the family, the type of viral code, a number of searches in the macro and then a list of the searches. In the first entry in the list, the search type "SEARCH_SOURCE_CODE," which activates a scan string engine, is coupled with a scan string (here,":\r") and a minimum number of times that the scan string must be found. If the scan string ":\r", which corresponds to searching for ":" at the end of a line, is found at least fifty times, a positive result is generated for the string search. If it is determined that each of the searches in the list returns a positive result, then a positive detection alarm is triggered.

The control word SEARCH_SOURCE_CODE enables searching for simple scan strings. To search for the text string "SET virusCode='Option.VirusProtection=false'", the following instruction is used: SEARCH_SOURCE_CODE{"SET virusCode='Option.VirusProtection=false'", 1}. The string "SET virusCode='Option.VirusProtection=false'" must be found at least once in the code for a positive result to be returned for the string search.

Additionally, scanning for statement types (e.g., function definition directly followed by a function end) may also be provided, as shown in the example above. A typical viral function is the disabling of special editor functionalities by overwriting system macros. ViewVBCode, which is responsible for display of the VBA editor, is an example of one such macro. To disable this macro functionality, the following code may be used:

Sub ViewVBCode
End Sub

On the other hand, if the code appears as follows, the heuristic engine may search for constructs with a ":" at the end of a typed line, which is interpreted by the VBA subsystem as start of a new line:

Sub ViewVBCode:
End Sub:

The apparatus and methods described above may be embodied in a computer program (or some unit of code) stored on/in computer readable medium, such as memory, hard drive or removable storage media. The apparatus and methods also may be in the form of a computer data signal, in one or more segments, embodied in a transmission medium, such as the Internet, an intranet, or another (wired or wireless) transmission medium. The present disclosure also encompasses, of course, execution of the computer program stored on/in a program storage device in a computing device/system, such as, for example, shown in FIG. 6.

The viral code detection methodologies described herein may be performed by a computer in one or a combination of the following circumstances. The viral code detection methodologies may be performed periodically (e.g., once/twice per day) or at selected times (e.g., each time the computer is powered up or restarted) by the computer on all relevant electronic files. In addition, the viral code detection methodologies may be performed on a file (or a data stream received by the computer through a network) before the file is stored/copied/executed/opened on the computer.

While examples are described above for a Windows-based platform, the present disclosure, as one of ordinary skill in the art would understand and appreciate, also may be applied to other computing platforms, including Macintosh-based, Unix-based (and Linux-based), as well as portable devices, such as Palm-based. Further, the exemplary sets of flags described above are the product of analyzing VBA code. As mentioned above and as it would be apparent to one of ordinary skill in the art after reading the present disclosure, the heuristic analysis mechanism described above may be adapted to analyze code written in other programming languages.

Figure 3:
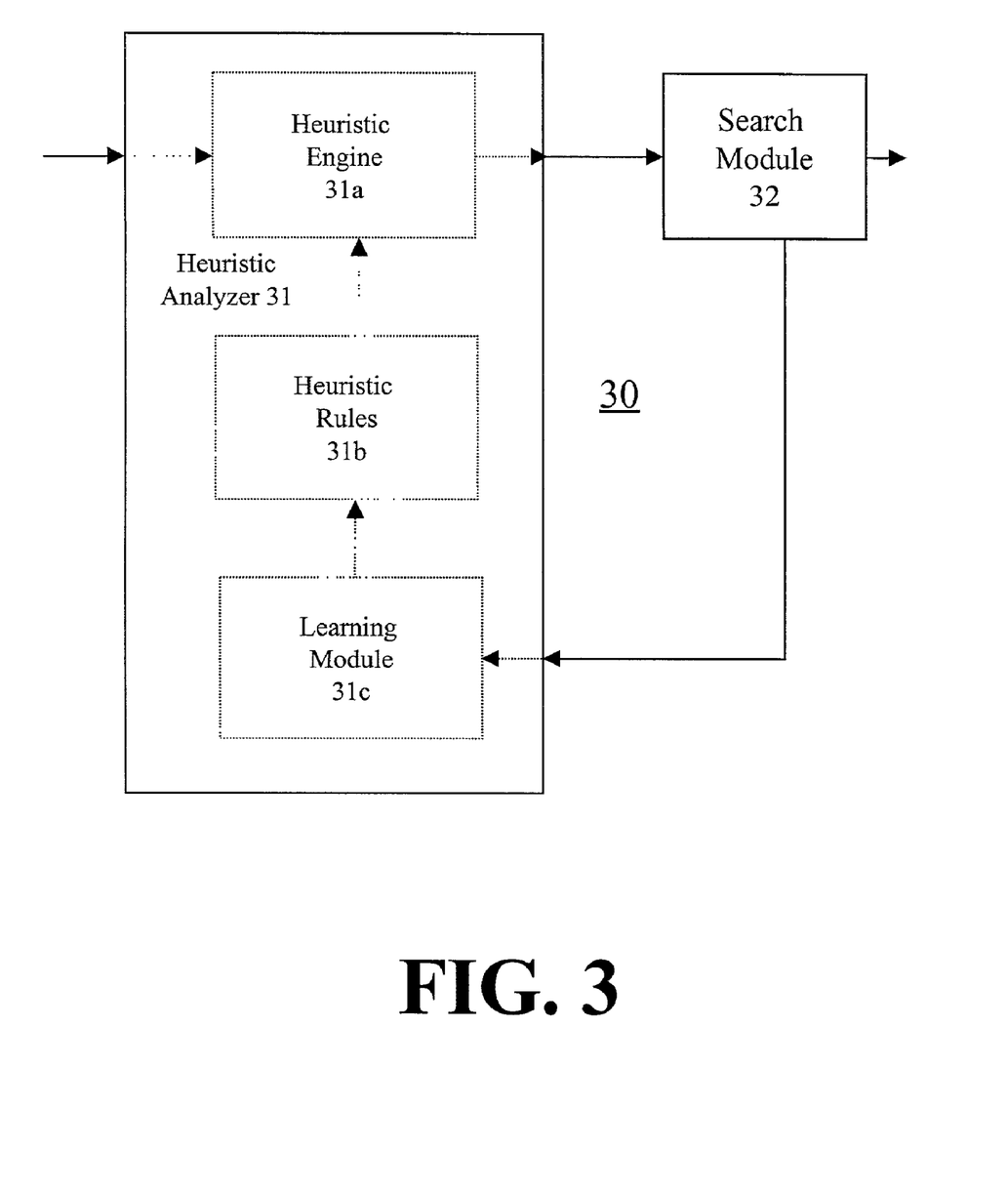
FIG. 3 shows a block diagram of an apparatus, according to another embodiment of the present disclosure, for detecting a class of viral code.

The heuristic analyzer, as suggested above, may be a rule-based module. Other artificial intelligence techniques may be integrated with assorted features of the present disclosure. For example, when new viral characteristics are identified, new heuristical rules may be added to the rule-based heuristic analyzer, by an administrator or via a learning module 31c (FIG. 3). As one of ordinary skill in the art would understand and appreciate, however, the heuristic analyzer need not be rule-based. Instead, the heuristics may be represented by other, static or dynamic, data structure types, and the heuristic analyzer may be embodied in hardware and/or conventional or object-oriented programming.

Further, while the search module in one embodiment is rule-based, the search module may be, in another embodiment, an intelligent network, such as a neural network.

Figure 4:
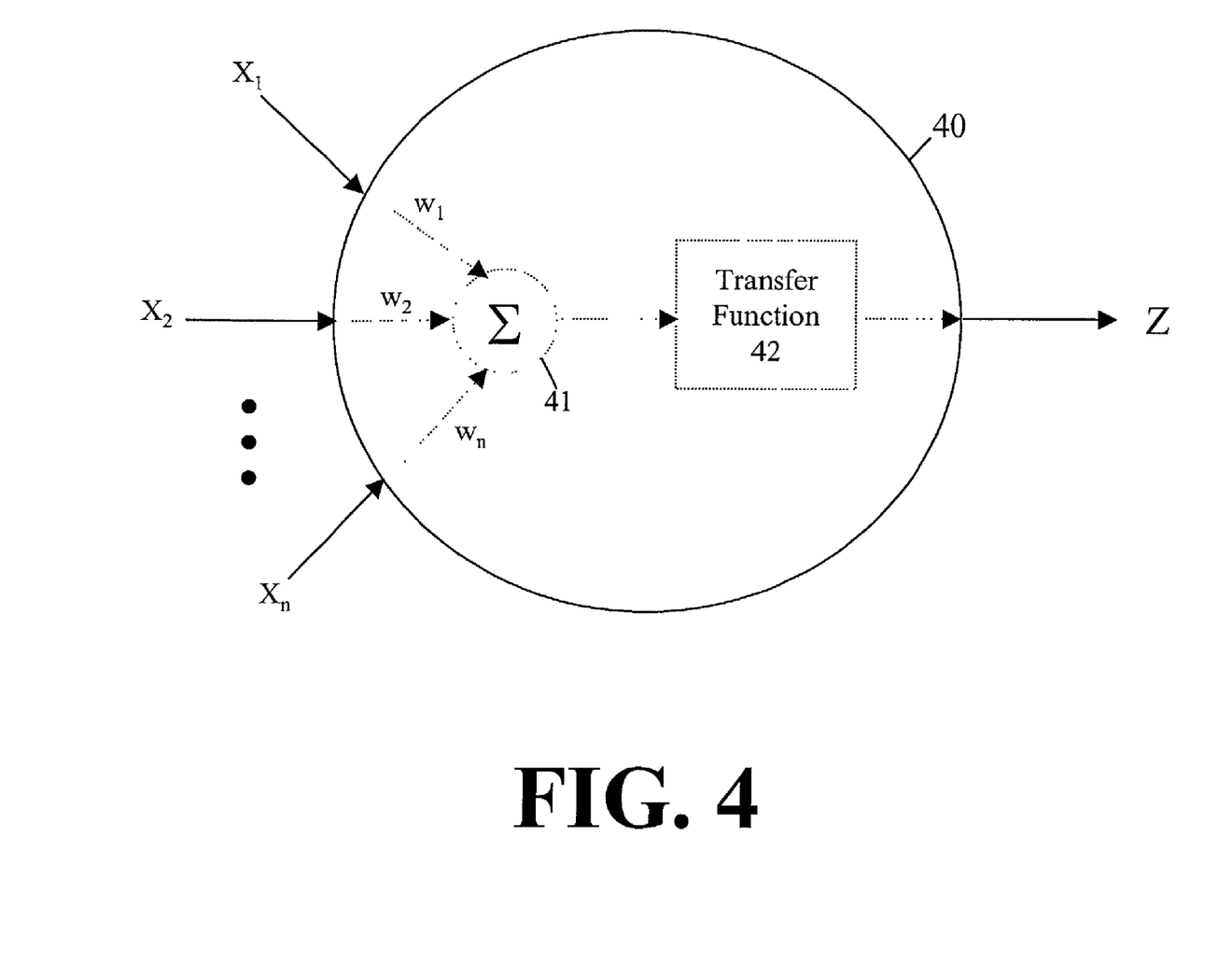
FIG. 4 shows a block diagram of a processing element which may be used in a neural network.

A neural network is an information processing modality which includes a number of interconnected neuron-like processing elements that send data to each other along connections. FIG. 4 shows a diagram of a single processing element 40. The processing element receives inputs $X_1$, $X_2, \ldots X_n$, either from other processing elements or directly from inputs to the network. It multiplies each of its inputs by corresponding weights $w_1, w_2, \ldots w_n$ and adds the results together to form a weighted sum 41. It then applies a transfer function 42 (which is typically non-linear) to the weighted sum, to obtain a value Z known as the state of the element. The state Z is then either passed on to one or more other elements along weighted connections, or provided as an output signal. Collectively, states are used to represent information in the short term, while weights represent long-term information or learning.

Figure 5:
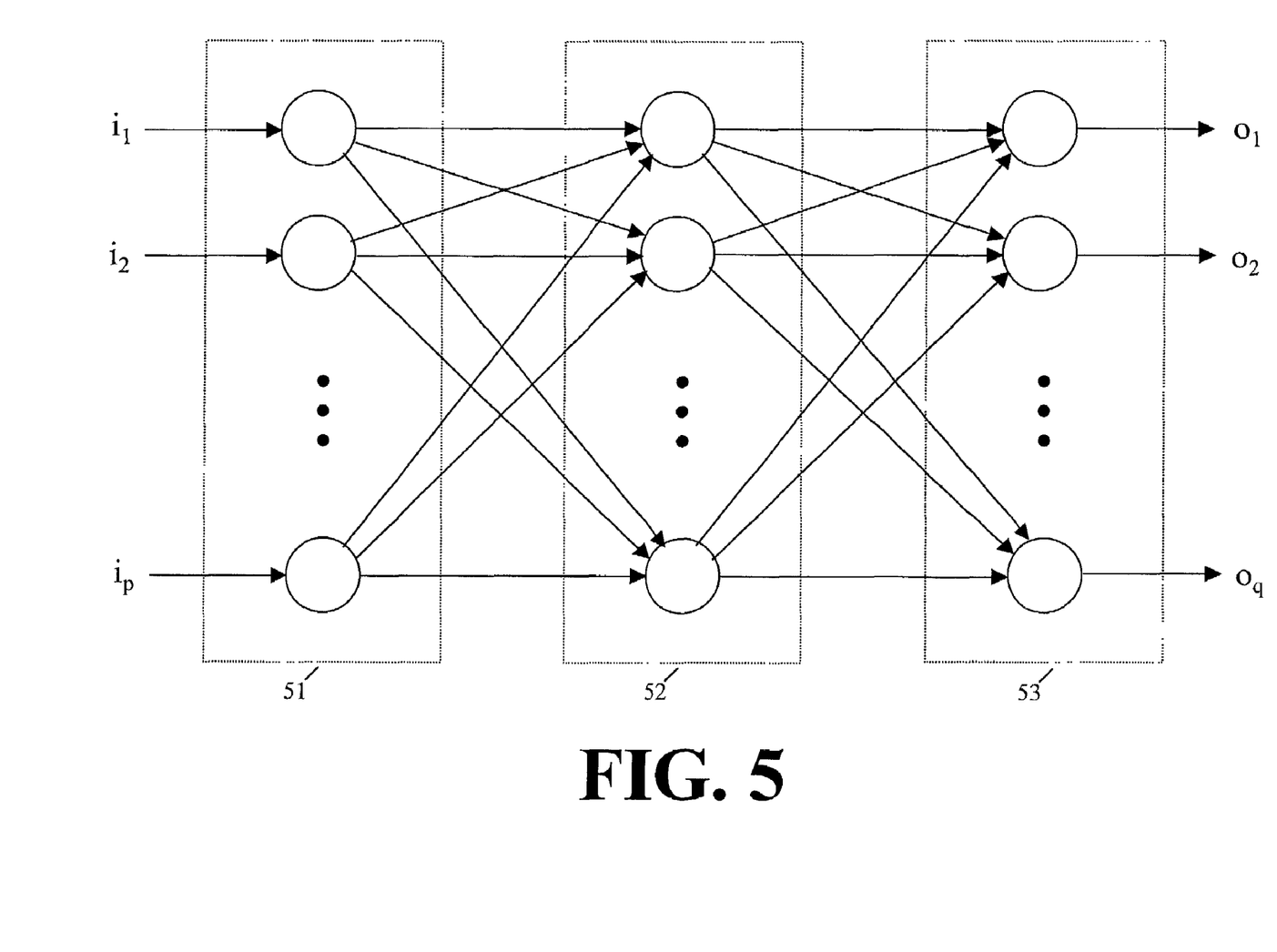
FIG. 5 shows a block diagram of a forward feeding, fully-connected, one hidden layer neural network.

Processing elements in a neural network typically are organized into layers: input layer processing elements (those which receive input data values); output layer processing elements (those which produce output values); and hidden layer processing elements (all others). Hidden layer processing elements allow the neural network to build intermediate representations that combine input data in ways that help the model to learn the desired mapping with greater accuracy. FIG. 5 shows a diagram illustrating the concept of hidden layer processing elements. Inputs $i_1, i_2, \ldots i_p$ are supplied to a layer of input processing elements 51. The outputs of the input elements are passed to a layer of hidden elements 52. Hidden layer elements pass outputs to a layer of output elements 53, and the output elements produce output values $o_1, o_2, \ldots o_q$. While the hidden layer processing elements are shown exemplarily in FIG. 5 as one layer of processing elements, neural networks may have multiple or no hidden layers.

Neural networks employ a technique of learning through repeated exposure to sample data and adjustment of the internal weights. The training process generally involves the following steps:

1) Repeatedly presenting examples of a particular input/output task to the neural network;
2) Comparing the network output and desired output to measure error; and
3) Modifying the weights to reduce the error.

This process is repeated until further iteration fails to decrease the error. Then, the network is said to be "trained."

Neural networks are able to capture nonlinearity and interactions among independent variables automatically without pre-specification. Training the neural network by applying specific, selected sample sets helps the network to develop quickly a general input-output model. Trained neural networks model the input-output relationship typically without requiring training with each and every possible set of inputs. Thus, neural networks are particularly suitable for, amongst other applications, pattern detection and recognition, even when a set of subject inputs was not one of the samples used to train the network.

FIG. 5 shows a forward feeding, fully-connected, one hidden layer neural network which may be adapted to operate as a search module in a system for detecting a class of viral code. The network may be adapted to accept as its inputs the set of flags with statistical information supplied by the heuristical analyzer and to recognize a single class of viral code (e.g., one output element) or a plurality of classes (multiple output elements). With appropriate selection of samples for training the network, the hidden layer processing elements in the trained network may correspond to the various possible scan string and statement type searches.

As one of ordinary skill in the art would recognize and understand, other networks may be used, alternatively. For a description of this and other neural networks, see, for example, David E. Rumelhart and James L. McClelland, Parallel Distributed Processing, Explorations in the Microstructure of Cognition, The MIT Press, Cambridge, Mass., U.S.A., 1986, and James L. McClelland and David E. Rumelhart, Explorations In Parallel Distributed Processing, A Handbook of Models, Programs, and Exercises, The MIT Press, Cambridge, Mass. 1988, the teachings of which are incorporated herein by reference.

The above specific embodiments are illustrative, and many variations can be introduced on these embodiments without departing from the spirit of the disclosure or from the scope of the appended claims. Elements and/or features of different illustrative embodiments may be combined with each other and/or substituted for each other within the scope of this disclosure and appended claims.

Additional variations may be apparent to one of ordinary skill in the art from reading the following U.S. provisional applications, which are incorporated herein by reference:

(a) Ser. No. 60/218,488, filed Jul. 14, 2000 and entitled "DETECTION OF A CLASS OF MALICIOUS CODE";
(b) Ser. No. 60/218,333, filed Jul. 14, 2000 and entitled "DETECTION OF SUSPICIOUS PRIVILEGED ACCESS TO RESTRICTED COMPUTER RESOURCES";
(c) Ser. No. 60/218,926, filed Jul. 14, 2000 and entitled "DETECTION OF DECRYPTION TO IDENTIFY ENCRYPTED VIRUS";
(d) Ser. No. 60/218,922, filed Jul. 14, 2000 and entitled "DETECTION OF POLYMORPHIC VIRUS CODE USING DATAFLOW ANALYSIS";
(e) Ser. No. 60/218,467, filed Jul. 14, 2000 and entitled "DETECTION OF MALICIOUS CODE USING EMULATION OF OPERATING SYSTEM FUNCTIONS"; and
(f) Ser. No. 60/218,313, filed Jul. 14, 2000 and entitled "DETECTION OF POLYMORPHIC SCRIPT LANGUAGE VIRUSES BY DATA DRIVEN LEXICAL ANALYSIS".

What is claimed is:

1. A method of detecting a class of viral code, comprising:
heuristically analyzing a subject file to detect at least one class of viral code, the heuristic analysis based at least in part on one or more rules;
identifying at least one new characteristic of a viral code;
generating at least one new rule, the at least one new rule based at least in part on the at least one new characteristic;
generating a set of flags based at least in part on the heuristic analysis;
using the set of flags to perform at least one search for a scan string and/or a statement type in the subject file; and
triggering a positive detection alarm if each of the at least one search is found at least a corresponding predetermined number of times.

2. The method of claim 1, wherein the subject file includes source code in a predetermined programming language.

3. The method of claim 2, wherein the predetermined programming language is a script language.

4. The method of claim 1, wherein the subject file includes a file for a predetermined word processor.

5. The method of claim 1, wherein at least one flag in the set of flags corresponds to a copy operation associated with a viral code of the at least one class of viral code.

6. The method of claim 1, wherein at least one flag in the set of flags corresponds to an operation for adding data from a string to a target module.

7. The method of claim 1, wherein at least one flag in the set of flags corresponds to an operation for importing another code.

8. The method of claim 1, wherein at least one flag in the set of flags corresponds to an operation for disabling virus protection features in a target application.

9. The method of claim 1, wherein the searched statement type corresponds to an operation for disabling functionalities in a target application.

10. The method of claim 1, wherein the searched statement type corresponds to an operation for overwriting system macros.

11. A program storage device readable by a machine, tangibly embodying a program of instructions executable by the machine to perform method steps for detecting a class of viral code, the method steps comprising:

heuristically analyzing a subject file to detect at least one class of viral code, the heuristic analysis based at least in part on one or more rules;
identifying at least one new characteristic of a viral code;
generating at least one new rule, the at least one new rule based at least in part on the at least one new characteristic;
generating a set of flags based at least in part on the heuristic analysis;
using the set of flags to perform at least one search for a scan string and/or a statement type in the subject file; and
triggering a positive detection alarm if each of the at least one search is found at least a corresponding predetermined number of times.

12. A computer system, comprising:
a processor; and
a program storage device readable by the computer system, tangibly embodying a program of instructions executable by the processor to perform method steps for detecting a class of viral code, the method steps comprising:
heuristically analyzing a subject file to detect at least one class of viral code, the heuristic analysis based at least in part on one or more rules;
identifying at least one new characteristic of a viral code;
generating at least one new rule, the at least one new rule based at least in part on the at least one new characteristic;
generating a set of flags based at least in part on the heuristic analysis;
using the set of flags to perform at least one search for a scan string and/or a statement type in the subject file; and
triggering a positive detection alarm if each of the at least one search is found at least a corresponding predetermined number of times.

13. Instructions embodied in a computer readable medium and executable by a computer for detecting a class of viral code, the instructions comprising:
a first segment including heuristic analyzer code to:
heuristically analyze a subject file to detect at least one class of viral code, the heuristic analysis based at least in part on one or more rules;
identify at least one new characteristic of a viral code;
generate at least one new rule, the at least one new rule based at least in part on the at least one new characteristic;
generate a set of flags based at least in part on the heuristic analysis; and
a second segment including scanner code using the set of flags to perform at least one search for a scan string and/or a statement type in the subject file, and triggering a positive detection alarm if each of the at least one search is found at least a corresponding predetermined number of times.

14. An apparatus for detecting a class of viral code, comprising:
an heuristic analyzer comprising:
an heuristic engine operable to:
heuristically analyze a subject file to detect at least one class of viral code, the heuristic analysis based at least in part on one or more rules;
identify at least one new characteristic of a viral code; and
generate a set of flags based at least in part on the heuristic analysis; and
a learning module operable to generate at least one new rule, the at least one new rule based at least in part on the at least one new characteristic; and
a search component, wherein the search component uses the set of flags generated by the heuristic analyzer to perform at least one search for a scan string and/or a statement type in the subject file, and triggers a positive detection alarm if each of the at least one search is found at least a corresponding predetermined number of times.

15. The apparatus of claim 14, wherein the heuristic analyzer further comprises a memory module operable to store the one or more rules.

16. The apparatus of claim 15, wherein the heuristic engine is further operable to parse the subject file using the one or more rules.

17. The apparatus of claim 15, wherein the one or more rules include sets of heuristic flags stored in a rules table.

18. The apparatus of claim 14, wherein the search component is rule-based and comprises a search engine and viral code class rules.

19. The apparatus of claim 14, wherein the search component is a neural network.

20. The method of claim 1, wherein the at least one search is performed using a neural network.

* * * * *